(12) United States Patent
Hirata et al.

(10) Patent No.: US 11,763,781 B2
(45) Date of Patent: Sep. 19, 2023

(54) INFORMATION DISPLAY APPARATUS

(71) Applicant: Maxell, Ltd., Kyoto (JP)

(72) Inventors: Koji Hirata, Kyoto (JP); Akio Misawa, Kyoto (JP); Takumi Nakada, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/841,676

(22) Filed: Jun. 16, 2022

(65) Prior Publication Data

US 2022/0319471 A1 Oct. 6, 2022

Related U.S. Application Data

(63) Continuation of application No. 16/982,593, filed as application No. PCT/JP2019/005748 on Feb. 18, 2019, now Pat. No. 11,398,208.

(30) Foreign Application Priority Data

Mar. 22, 2018 (JP) .................................. 2018-054592

(51) Int. Cl.
| | | |
|---|---|---|
| *G09G 5/38* | (2006.01) | |
| *B60K 35/00* | (2006.01) | |
| *G02B 27/01* | (2006.01) | |

(52) U.S. Cl.
CPC .............. *G09G 5/38* (2013.01); *B60K 35/00* (2013.01); *G02B 27/0101* (2013.01);
(Continued)

(58) Field of Classification Search
CPC .... G09G 5/38; G09G 3/002; G09G 2360/144; G09G 2340/0464; G09G 2340/0485;
(Continued)

(56) References Cited

U.S. PATENT DOCUMENTS

| | | |
|---|---|---|
| 2010/0157430 A1 | 6/2010 | Hotta et al. |
| 2013/0050655 A1 | 2/2013 | Fujikawa et al. |
| | (Continued) | |

FOREIGN PATENT DOCUMENTS

| | | |
|---|---|---|
| JP | 2007-280203 A | 10/2007 |
| JP | 2009-229552 A | 10/2009 |
| | (Continued) | |

OTHER PUBLICATIONS

International Search Report and Written Opinion dated Apr. 23, 2019 for PCT/JP2019/005748 filed on Feb. 18, 2019, 11 pages.
Office Action dated Jul. 26, 2022, in corresponding Japanese patent Application No. 2021-129414, 7 pages.

*Primary Examiner* — Christopher E Leiby
(74) *Attorney, Agent, or Firm* — XSENSUS LLP

(57) ABSTRACT

An information display apparatus capable of reducing the viewpoint movement of a driver and achieving safer driving in consideration of the relationship between the traveling speed and the stopping distance of a vehicle is provided. The information display apparatus is configured to display image information in a transportation and comprises a HUD apparatus disposed between a windshield of the transportation and an instrument panel of the transportation. The HUD apparatus detects a viewpoint position of a driver; and displays a virtual image of the image information in front of the transportation by reflecting light emitted from the HUD apparatus to display the image information by the windshield. The HUD apparatus is configured to set a display position of the virtual image in accordance with movement of the viewpoint position of the driver who is driving the transportation.

18 Claims, 10 Drawing Sheets

(52) U.S. Cl.
CPC .... *G02B 27/0179* (2013.01); *B60K 2370/149* (2019.05); *B60K 2370/1529* (2019.05); *B60K 2370/178* (2019.05); *B60K 2370/179* (2019.05); *B60K 2370/23* (2019.05); *G02B 2027/0141* (2013.01); *G02B 2027/0183* (2013.01); *G02B 2027/0187* (2013.01); *G09G 2340/0464* (2013.01); *G09G 2360/144* (2013.01); *G09G 2380/10* (2013.01)

(58) Field of Classification Search
CPC ... G09G 2340/0471; G09G 2340/0478; G09G 2380/10; G02B 27/0093; G02B 27/0101; G02B 27/0179; G02B 2027/0183; G02B 2027/014; G02B 2027/0141; B60K 35/00; B60K 2370/167; B60K 2370/178; B60K 2370/179; B60K 2370/1529

See application file for complete search history.

(56) References Cited

U.S. PATENT DOCUMENTS

| | | |
|---|---|---|
| 2016/0178902 A1 | 6/2016 | Ando et al. |
| 2017/0057414 A1* | 3/2017 | Hayashi ................ H04N 7/181 |
| 2021/0041707 A1 | 2/2021 | Misawa et al. |

FOREIGN PATENT DOCUMENTS

| | | |
|---|---|---|
| JP | 2010-143520 A | 7/2010 |
| JP | 2011-218891 A | 11/2011 |
| JP | 2015-034919 A | 2/2015 |
| JP | 2015-160445 A | 9/2015 |
| JP | 2016-118859 A | 6/2016 |

* cited by examiner

FIG. 1
(a)
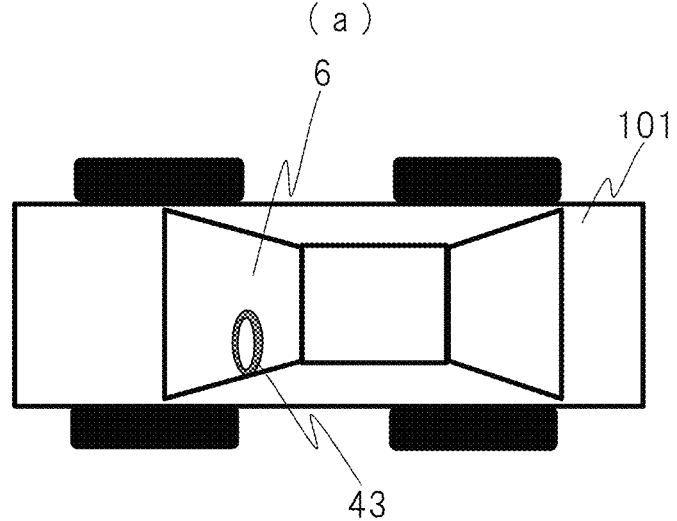
(b)
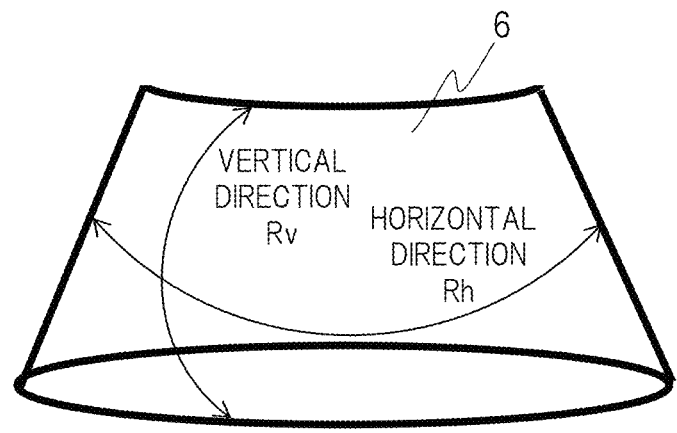

FIG. 2
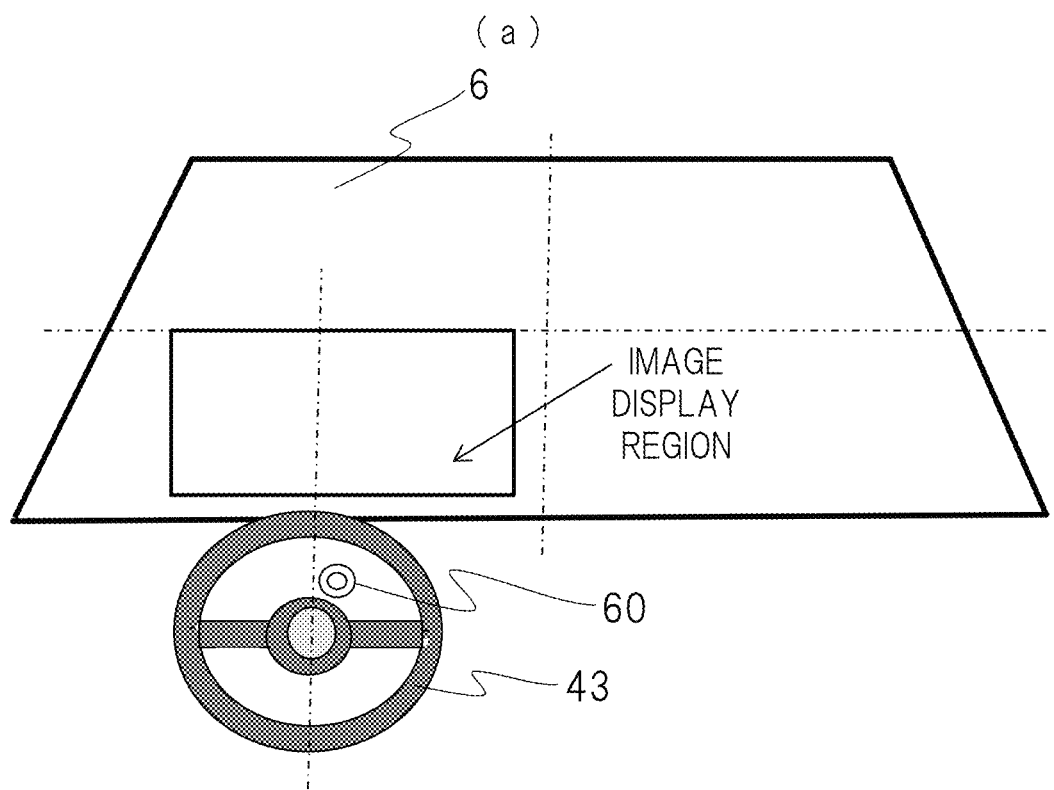
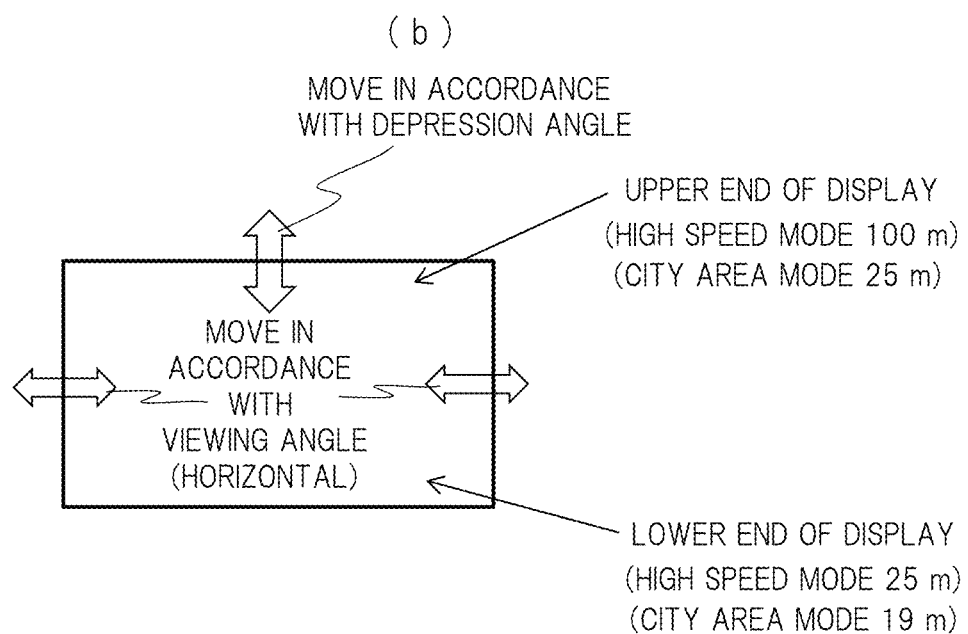

RELATIONSHIP BETWEEN TRAVELING SPEED AND STOPPING DISTANCE

FIG. 8
VIEWPOINT MOVEMENT ON GENERAL ROAD
(a)
DAYTIME
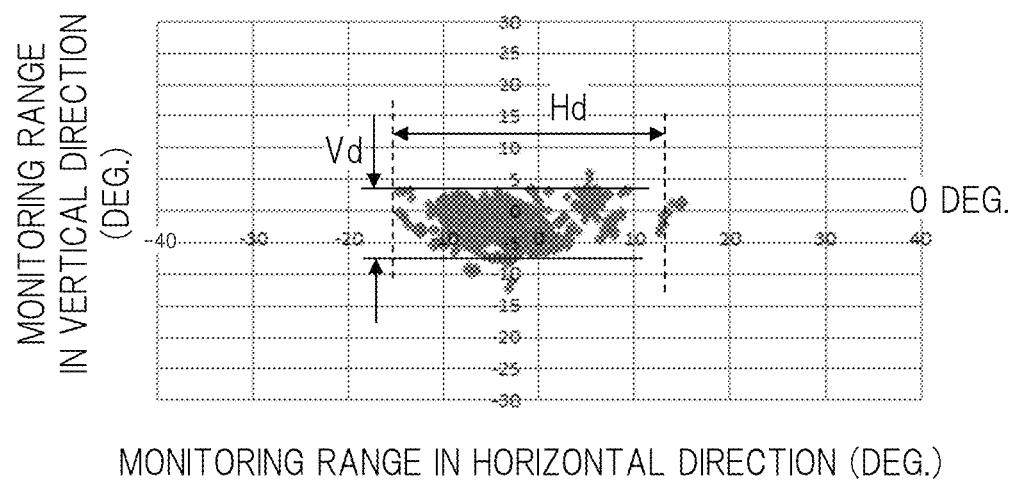
MONITORING RANGE IN HORIZONTAL DIRECTION (DEG.)
(b)
NIGHTTIME
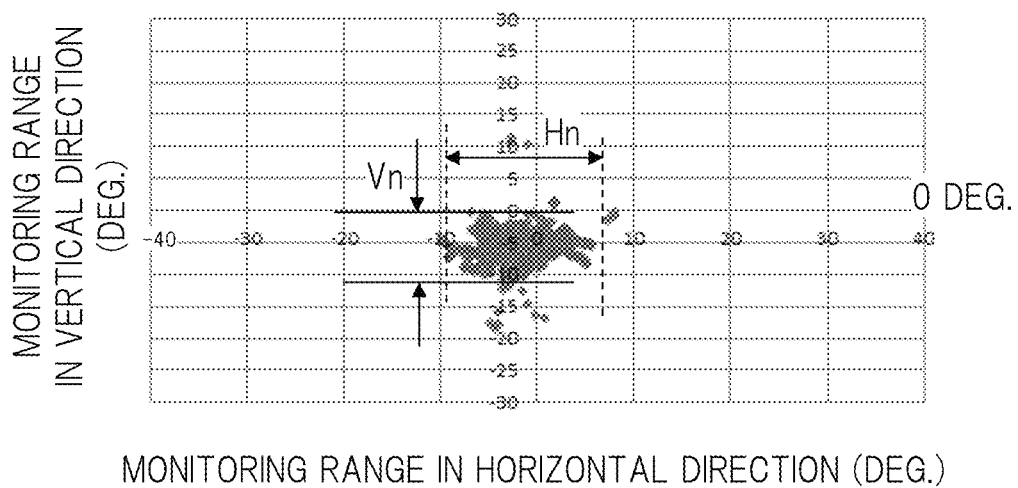
MONITORING RANGE IN HORIZONTAL DIRECTION (DEG.)

FIG. 9
VIEWPOINT MOVEMENT ON EXPRESS WAY
(a)
DAYTIME
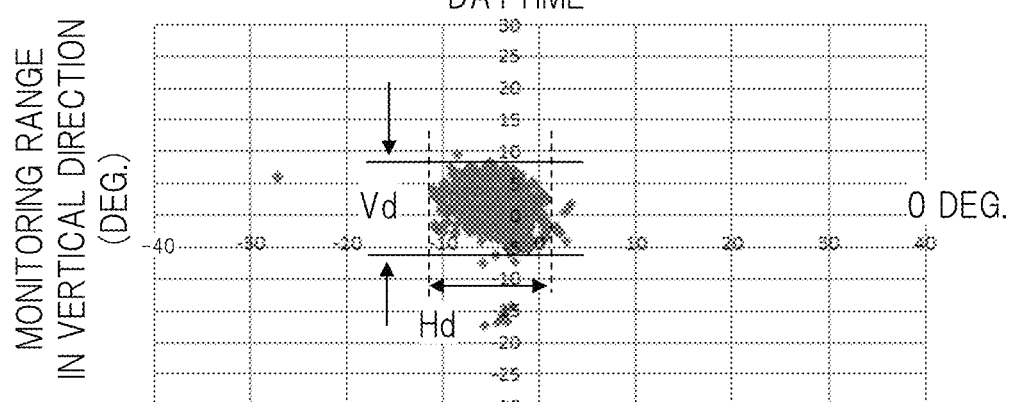
MONITORING RANGE IN HORIZONTAL DIRECTION (DEG.)
(b)
NIGHTTIME
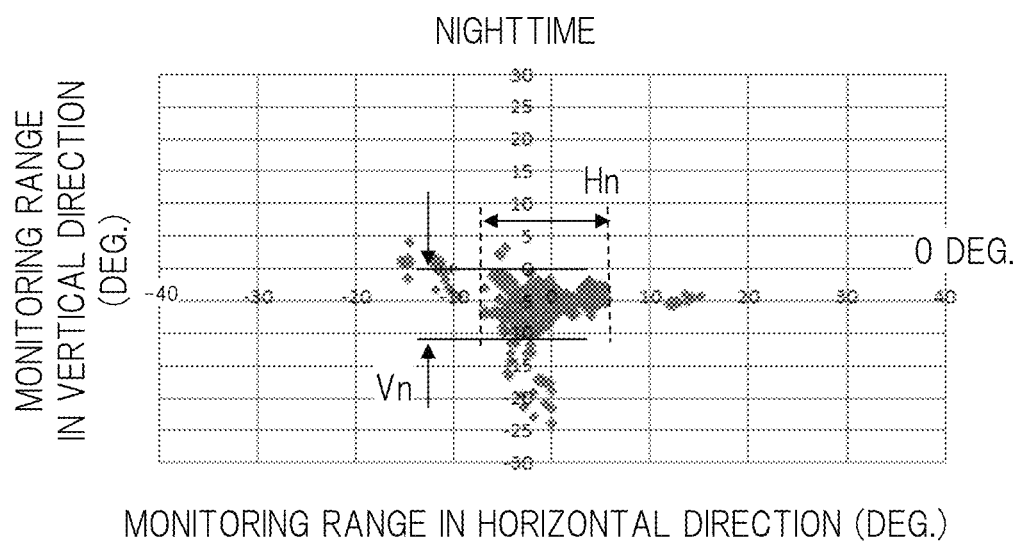
MONITORING RANGE IN HORIZONTAL DIRECTION (DEG.)

INFORMATION DISPLAY APPARATUS

CROSS-REFERENCE TO RELATED APPLICATIONS

The present application is a continuation of U.S. application Ser. No. 16/982,593, filed Sep. 21, 2020, which is based on PCT filing PCT/JP2019/005748, filed Feb. 18, 2019, which claims priority to JP 2018-054592, filed Mar. 22, 2018, the entire contents of each are incorporated herein by reference.

TECHNICAL FIELD

The present invention relates to an information display apparatus configured to project an image on a windshield of a so-called transportation that moves to carry people such as automobile, train, aircraft, or the like.

BACKGROUND ART

A so-called head-up-display (HUD) apparatus configured to project image light onto a windshield of a vehicle to form a virtual image, thereby displaying traffic information such as route information and traffic congestion information and vehicle information such as remaining fuel amount and cooling water temperature has already been known from, for example, Patent Document 1 below, and downsizing for disposing a main body of the HUD apparatus between the steering wheel and the windshield in front of the driver's seat is desired.

In this type of information display apparatus, for the purpose of making it easier for the driver to recognize the information, it is required to form the virtual image at a plurality of positions in accordance with the visual recognition position of the driver, in other words, to adjust the distance at which the virtual image is formed to the visual recognition position of the driver. Thus, as disclosed in, for example, Patent Document 2 below, there is an information display apparatus in which an image is formed at each of a distant position (long distance) and a close position (short distance) from a driver.

RELATED ART DOCUMENTS

Patent Documents

Patent Document 1: Japanese Patent Application Laid-open Publication No. 2009-229552
Patent Document 2: Japanese Patent Application Laid-open Publication No. 2015-034919

SUMMARY OF THE INVENTION

Problems to be Solved by the Invention

In the above-mentioned conventional HUD apparatus, various types of information are provided to the driver by projecting image light onto the windshield of a vehicle to form a virtual image, but the provision of the information in consideration of larger screen using next-generation technologies such as the big data (high precision 3D map information) and the AI information (predicted hazard information, etc.) has not been sufficiently taken into account. Therefore, as will be described in detail later, there is still room for improvement from the perspective of improving the safety by reducing the viewpoint movement of the driver, and the structure of the HUD apparatus (in particular, the increase in the set volume of the HUD) for making it possible to set the virtual image display position to the optimum position has also not been sufficiently taken into account.

Therefore, an object of the present invention is to provide an information display apparatus capable of displaying information in such a way that the viewpoint movement of the viewer is made smoother in consideration of the viewpoint movement of the driver and the relationship between the traveling speed and the stopping distance of the vehicle.

Means for Solving the Problems

The present invention has been made in light of the above-mentioned background technology and the problem thereof, and an example thereof is an information display apparatus configured to display image information in a transportation. The information display apparatus comprises a HUD apparatus disposed between a windshield of the transportation and an instrument panel of the transportation, wherein the HUD apparatus includes: driver's viewpoint position detecting means configured to detect a viewpoint position of a driver; and a virtual image optical system configured to display a virtual image of the image information in front of the transportation by reflecting light emitted from the HUD apparatus to display the image information by the windshield, and the HUD apparatus is configured to set a display position of the virtual image in accordance with movement of the viewpoint position of the driver who is driving the transportation, detected by the driver's viewpoint position detecting means.

Effects of the Invention

According to the present invention described above, by the information display using a virtual image in accordance with the movement of viewpoint position of a driver who is driving a transportation and further by the information display in consideration of the relationship between the traveling speed and the stopping distance of a vehicle, the viewpoint movement of the driver is reduced and the safer driving is achieved. In particular, by applying to so-called alert display (information) or the like, which is the information for giving a warning of the presence of a pedestrian in front of the vehicle and a preceding vehicle, it is possible to perform the display to a dangerous object farther than the stopping distance of the own vehicle.

BRIEF DESCRIPTIONS OF THE DRAWINGS

FIG. 1 is a diagram showing an upper surface and a windshield of an automobile in which an information display apparatus according to an embodiment of the present invention is mounted;

FIG. 2 is a schematic diagram of a windshield viewed from a driver's seat of the automobile in which the information display apparatus according to the present invention is mounted and a diagram showing an enlarged image display region (area) of the HUD;

FIG. 8 is a diagram showing an example of a traveling speed of a vehicle and a range of viewpoint movement;

FIG. 9 is a diagram showing an example of a traveling speed of a vehicle and a range of viewpoint movement;

DETAILED DESCRIPTION OF PREFERRED EMBODIMENTS

Figure 3:
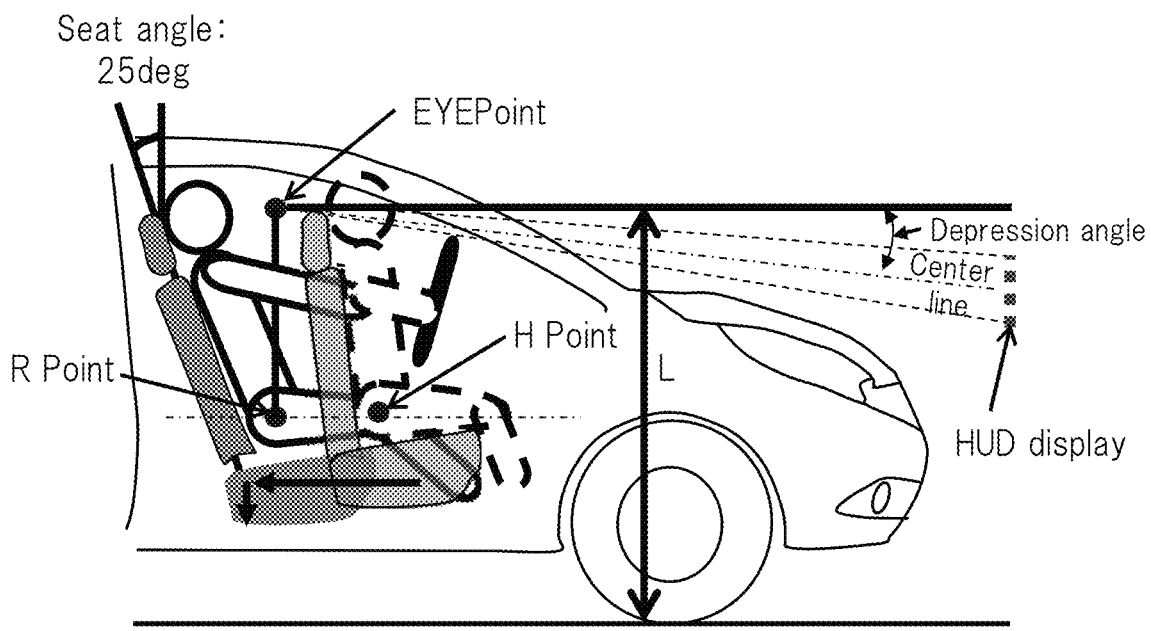
FIG. 3 is an explanatory diagram of setting conditions of a viewpoint (EYE Point)

Hereinafter, an embodiment of the present invention and various examples will be described with reference to drawings and the like. Note that the following descriptions show specific examples of the contents of the embodiment, the present invention is not limited to these descriptions, and various changes and modifications can be made by a person having ordinary skill in the art within the scope of the technical idea disclosed in this specification. In addition, in all the drawings for describing the present invention, components having the same function are denoted by the same reference characters, and repetitive description thereof will be omitted in some cases. Prior to the description of the embodiment of the present invention, the display position of the virtual image, which is a feature of the present invention, will be described below.

FIG. 1(a) is a top view of an automobile in which the information display apparatus according to the present invention is mounted, and a windshield as a projection-receiving member 6 exists in a front part of the driver's seat of a vehicle body 101. Note that the inclination angle of the windshield with respect to the vehicle body differs depending on the type of vehicle. Furthermore, the inventors also investigated the radius of curvature of the windshield in order to realize the optimal virtual image optical system. As a result, as shown in FIG. 1(b), the windshield had a radius of curvature Rh in the horizontal direction parallel to the contact plane of the automobile and a radius of curvature Rv in the vertical direction orthogonal to the horizontal axis, which are different from each other, and Rh and Rv generally had the following relationship.

$$Rh > Rv$$

It was also found that the difference in radius of curvature, that is, the ratio of Rh to Rv was within the range of 1.5 to 2.5 times in many cases.

Next, the inventors also investigated commercial products for the inclination angle of the windshield. As a result, although it varied depending on the vehicle body type, it was 20 to 30 degrees for the light automobile and one-box type, 30 to 40 degrees for the sedan type, and 40 degrees or more for the sports-car type.

FIG. 2(a) is a schematic diagram of the windshield 6 viewed from a driver's seat of the automobile in which the information display apparatus according to the present invention is mounted, and an enlarged image display region (area) of the HUD is provided near the center of the windshield 6 in front of a steering wheel 43 as shown in FIG. 2(a). FIG. 2(b) shows the details of the image display region (area) of the HUD, and as shown by the arrows in the drawing, the display region moves up and down in accordance with the change in the depression angle, and its width is varied in accordance with the change in the viewing angle (horizontal). Specifically, as an example, the depression angle is set to 3.0° when driving in the city area at 30 to 60 km/h (city area mode), and it is switched (reduced) to 1.9° when driving at a high speed of 60 to 100 km/h (high speed mode). Further, the viewing angle (horizontal) is 10° in the city area mode and is narrowed to 9° in the high speed mode. Note that the viewing angle (vertical) is constant at, for example, 2.2°. In the image display region (area) of the HUD above, as will be described later, the upper end thereof is 100 m in front of the vehicle and the lower end thereof is 25 min the high speed mode (depression angle=1.9°). In the city area mode (depression angle=3.0°), the upper end thereof is 25 m in front of the vehicle and the lower end thereof is 19 m. Note that the switching between the city area mode and the high speed mode could be made based on the information from the navigation system described below.

FIG. 3 is an explanatory diagram of setting conditions of a viewpoint (EYE Point). This EYE Point is set based on an R Point which is the axis of rotation between the thigh and the trunk of the human body (model) and an H Point defined when the human body (model) is seated in the state where the seat is located at the backmost position, the seat height is at the bottom, and the seat angle is at 25 deg (degrees), and the depression angle is determined by the angle of the center line to the HUD display from this EYE Point.

Further, a reference character 60 in FIG. 2 denotes a camera including, for example, an infrared camera attached to a part of the steering wheel, and it constitutes means for detecting the driver's viewpoint here. Note that the viewpoint monitoring camera 60, which is the driver's viewpoint detecting means, does not necessarily have to be attached to a part of the steering wheel as described above, and may be attached to, for example, a part of a dashboard or a part of a windshield as long as it can detect the viewpoint of the driver.

<Relationship Between Traveling Speed and Stopping Distance of Vehicle>

Figure 4:
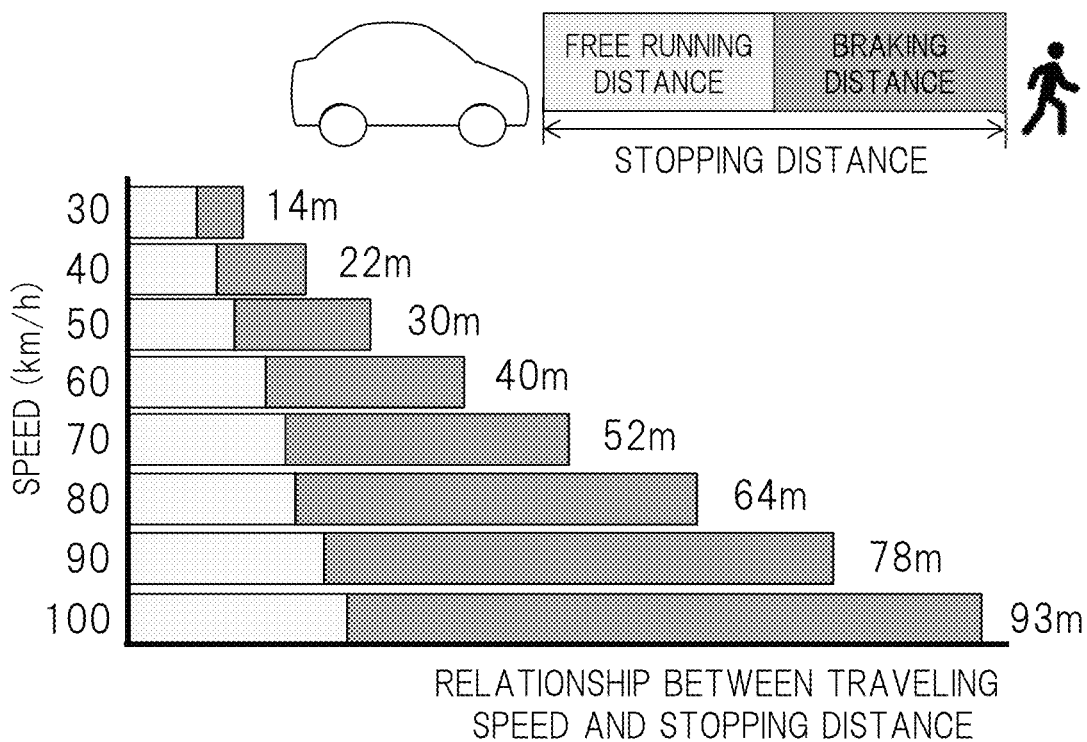
FIG. 4 is a diagram showing an example of the relationship between the traveling speed and the stopping distance of a vehicle.

Normally, the distance required before a traveling vehicle stops (stopping distance) changes in proportion to the traveling speed of the vehicle as shown in FIG. 4. Namely, a vehicle running at a speed of 30 km/h needs a stopping distance of 14 m which is a total of the free running distance and the braking distance, the stopping distance of 52 m is required at a speed of 70 km/h, and the stopping distance of as much as 93 m is required at a speed of 100 km/h.

On the other hand, the HUD apparatus which is an information display apparatus provides various types of information to the driver by projecting image light onto the windshield of an automobile to form a virtual image, but the virtual image is generally displayed at the preset position in front of the vehicle in most cases. However, when the above-mentioned relationship between the traveling speed and the stopping distance of the vehicle is taken into account, it has been found that the so-called alert display (information) or the like which is information for giving a warning of the presence of a pedestrian in front of the vehicle and a preceding vehicle makes it possible to reduce the viewpoint movement of the driver and achieve the safer driving by displaying the alert to a dangerous object farther than the stopping distance of the vehicle.

Namely, the present invention provides a HUD apparatus capable of achieving the safer driving in consideration of the relationship between the traveling speed and the stopping distance of the vehicle described above, and further provides a HUD apparatus capable of solving the problem that occurs when the display position of the virtual image (distance in front of the vehicle) is made variable, that is, the increase in the apparatus volume due to the size increase of the optical system including the concave mirror used in the above-mentioned conventional technology.

<Information Display Apparatus>

Figure 5:
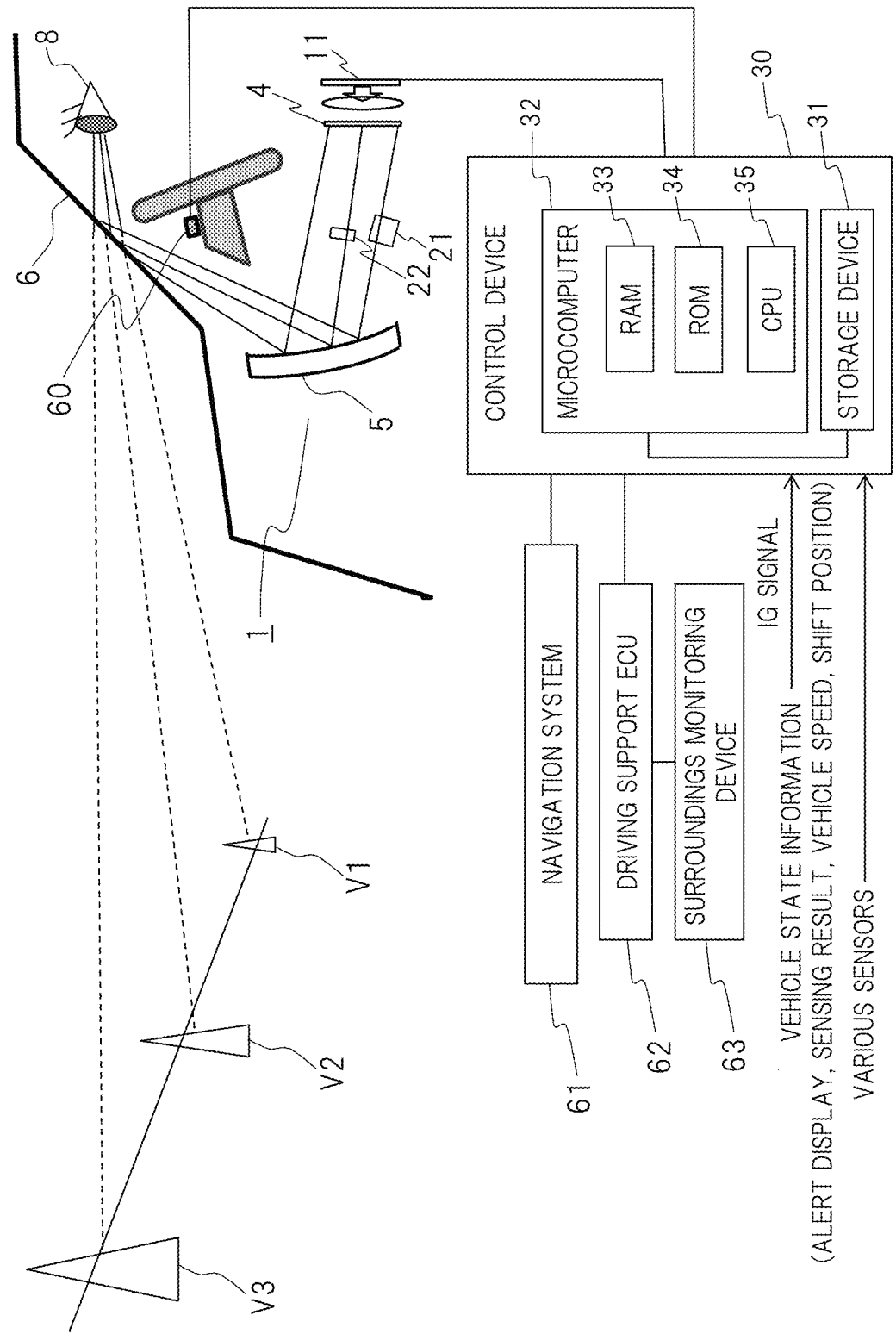
FIG. 5 is a block diagram and a schematic configuration diagram showing a peripheral equipment configuration of a HUD apparatus 1 according to an embodiment of the present invention.

FIG. 5 is a block diagram and a schematic configuration diagram showing a peripheral equipment configuration of the HUD apparatus 1 according to an embodiment of the present invention, and a HUD apparatus configured to project an image on a windshield of an automobile will be particularly described as an example here.

The HUD apparatus 1 is configured to display various types of information reflected by the projection-receiving member 6 (windshield in this embodiment) as virtual image VI (Virtual Image) in order to form virtual images V1 to V3 at a plurality of positions in front of the own vehicle in the driver's line of sight 8. Note that any member can be applied as the projection-receiving member 6 as long as the information can be projected on the member, and it may be a combiner other than the windshield mentioned above. Namely, in the HUD apparatus 1 according to this embodiment, a virtual image is formed at each of a plurality of positions in front of the own vehicle in the driver's line of sight 8 so as to make the driver visually recognize the image, and examples of the information displayed as the virtual image include an alert display (information) that gives a warning of the presence of a pedestrian in front of the vehicle and a preceding vehicle, vehicle information, and foreground information captured by a camera (not shown) such as a monitoring camera or an around viewer.

In addition, the HUD apparatus 1 includes an image projection device 11 configured to project image light for displaying information, an intermediate image forming unit 4 configured to form an image of the light from the image projection device 11, an optical component 5 configured to converge or diverge the image information (image light) that has been formed in the intermediate image forming unit 4, and a control device 30 configured to control the image projection device 11 mentioned above. Note that the above-mentioned optical component 5 is a virtual image optical system described below, and includes a concave mirror to reflect light. Further, the light reflected by the optical component 5 is reflected by the projection-receiving member 6 and is directed to the driver's line of sight 8 (Eye Box: described in detail later).

The intermediate image forming unit (or intermediate image display unit) 4 mentioned above has a function of forming an image of the light from the image projection device 11, and is configured of, for example, a microlens array in which microlenses are two-dimensionally arranged. In this embodiment, an optical element 21 and an optical element 22 are arranged between the intermediate image forming unit 4 and the optical component 5 composed of the concave reflecting mirror constituting an eyepiece optical system. The first purpose of arranging the optical element 21 and the optical element 22 is to set the virtual image forming positions at a plurality of positions (three positions in FIG. 5) in front of the own vehicle. Further, the second purpose thereof is to perform the aberration correction at the position where the image light from the intermediate image forming unit 4 is separated between the intermediate image forming unit 4 and the optical component 5 constituting the eyepiece optical system. With the aberration correction by these optical elements, even if virtual images are formed at different positions, a plurality of virtual images can be displayed at different magnifications by using the same virtual image optical system.

More specifically, the optical element 21 corrects the aberration of the light flux that forms the virtual image V1 located at the closest position, and at the same time, the optical element 22 corrects the aberration of the virtual image V2 located at an intermediate position. Further, since the aberration of the virtual image V3 formed at the farthest position is optimally designed in the original virtual image optical system, no optical element is provided here. However, it goes without saying that even if an optical element optimally designed for improving the aberration correction capability is provided, it does not depart from the technical idea or the scope of the present invention. Here, as an example, the virtual image V1 is displayed at a distance of 14 m or more in front of the vehicle, the virtual image V2 is displayed at a distance of 52 m or more, and the virtual image V3 is displayed at a distance of 93 m or more.

In addition, for convenience of description, the example in which the positions to generate the virtual images are divided into the distant virtual image V3, the intermediate virtual image V2, and the close virtual image V1 and the optical elements 21 and 22 are individually provided has been described in this embodiment, but the present invention is not limited to this. For example, in order to continuously change the display position of the virtual image from a distant position to a close position, the position where the virtual image is generated is changed by changing the spatial optical distance, more specifically, changing the thickness of the optical element in the direction vertical to the screen, and sufficient aberration correction capability is provided by designing the lens shapes on both surfaces of the optical element to have an eccentric aspherical surface shape or a free-form surface shape. As a result, it goes without saying that even the configuration provided with one optical element does not depart from the technical idea or the scope of the present invention.

On the other hand, the control device 30 includes a storage device 31 and a microcomputer 32. The storage device 31 is composed of a non-volatile storage device in which stored contents are rewritable. The microcomputer 32 is mainly composed of a ROM 34 that stores a processing program and data whose stored contents need to be retained even when the power is turned off, a RAM 33 that temporarily stores the processing program and data, and a computer having a CPU 35 that executes various processes in accordance with the processing program stored in the ROM 34 and the RAM 33.

Among them, the ROM 34 stores a processing program for the microcomputer 32 to execute information display process for controlling the image projection device 11 so that various types of information such as vehicle information and foreground information are projected on the projection-receiving member 6. Then, at least a navigation system 61, a driving support electronic control unit (hereinafter, referred to as "driving support ECU (Electronic Control Unit)) 62, and further, the viewpoint monitoring camera 60 mentioned above are connected to the control device 30 as an acquisition source of the vehicle information and the foreground information.

The navigation system 61 is a device that guides a route to a set destination in accordance with the result of matching the current position detected by a position detecting device with map data stored in a map data storage unit. The map data includes various types of information such as road speed limits, the number of lanes, and information about intersections.

The control device 30 acquires, from the navigation system 61 mentioned above, information such as the speed limit and the number of lanes of the road corresponding to the current position where the own vehicle is traveling and the planned travel route of the own vehicle set in the navigation system 61 as the foreground information (that is, information displayed in front of the own vehicle by the virtual image).

The driving support ECU 62 is a control device that realizes driving support control by controlling a drive system and a control system in accordance with an obstacle detected as a result of the monitoring by a surroundings monitoring device 63, and examples of the driving support control include well-known technologies such as cruise control, adaptive cruise control, pre-crash safety, and lane keeping assist.

The surroundings monitoring device 63 is a device that monitors the surroundings of the own vehicle, and examples thereof include a camera that detects an object existing around the own vehicle based on an image of the surroundings of the own vehicle and a sensor device that detects an object existing around the own vehicle based on the result of transmitting and receiving sensing waves. Note that, in this embodiment, the surroundings monitoring device 63 also distinguishes between day and night by detecting (sensing) external light with the camera described above.

The control device 30 acquires such information from the driving support ECU 62 (for example, the distance to the preceding vehicle, the azimuth of the preceding vehicle, and the position where the obstacle or the sign exists) as the foreground information. Further, an ignition (IG) signal and vehicle state information are input to the control device 30. Among these pieces of information, the vehicle state information is information acquired as vehicle information and includes warning information indicating that the amount of fuel remaining in the internal combustion engine or the temperature of cooling water becomes a predetermined abnormal state. In addition, the vehicle state information also includes the information about the operation result of the direction indicator, the traveling speed of the own vehicle, the shift position, and others. The control device 30 described above is activated when an ignition signal is input. The above is the description of the entire system of the information display apparatus according to the embodiment of the present invention.

<Optimization of Virtual Image Display Position>

Next, the display position (range) of the virtual image generated by the above-described information display apparatus in the HUD image display region will be described in detail below, while particularly taking the alert display as an example.

In the information display apparatus according to the present invention, as described above, when providing the alert display for a dangerous object farther than the stopping distance (for example, a pedestrian in front of the vehicle or a preceding vehicle), the display position (range) necessary for the alert display is obtained based on the relationship between the traveling speed and the stopping distance of the own vehicle, and the display position is determined including the optimum viewing angle (FOV). For example, when the traveling speed is 30 km/h, the alert display is performed at a distance of 14 m or more to avoid the danger.

Figure 6:
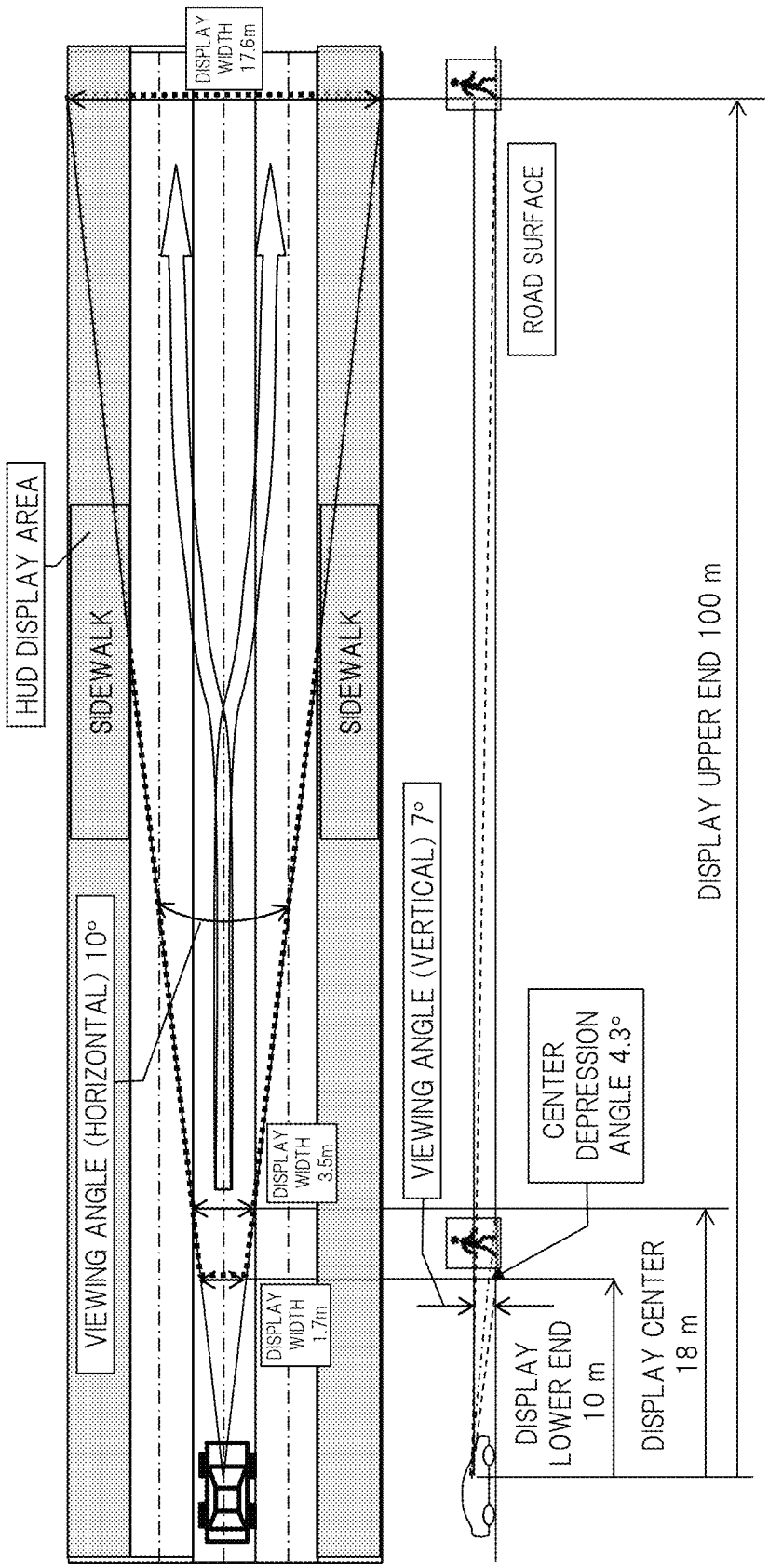
FIG. 6 is a diagram showing a display position (range) of a virtual image in a HUD image display region while using an alert display for a pedestrian as an example.

FIG. 6 shows a state in which the above-mentioned alert display is performed for a pedestrian, and as is clear from the drawing, the alert display for a pedestrian is performed near the lower end of the image display region (area) of the HUD shown in FIG. 2 during the driving in the city area. According to this, as is apparent from the left part of the drawing, the alert display performed near the lower end of the image display region (area) of the HUD is displayed at a distance of about 19 m in front of the vehicle. On the other hand, during the driving at high speed, as is clear from the left part of the drawing, the alert display is performed near the upper end. According to this, the alert display performed near the upper end of the image display region (area) of the HUD is displayed at a distance of about 100 m in front of the vehicle.

Figure 7:
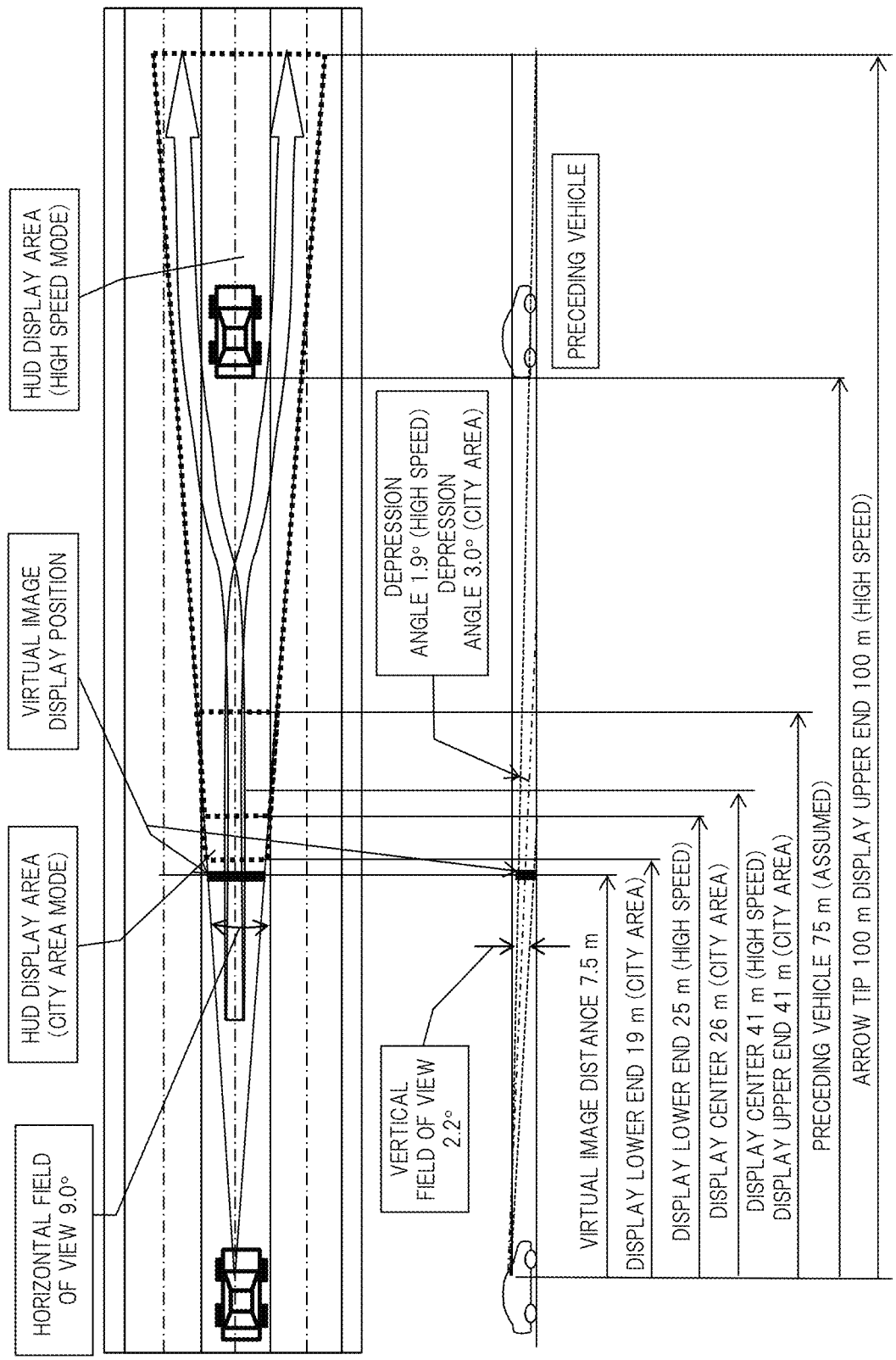
FIG. 7 is a diagram showing a display position (range) of a virtual image in a HUD image display region while using an alert display for a preceding vehicle as an example.

FIG. 7 shows a state in which the above-mentioned alert display is performed for a preceding vehicle, and as is clear from the drawing, the alert display for a preceding vehicle is performed near the lower end of the image display region (area) of the HUD shown in FIG. 2 during the driving in the city area. According to this, as is apparent from the left part of the drawing, the alert display performed near the lower end of the image display region (area) of the HUD is displayed at a distance of about 19 m in front of the vehicle. On the other hand, during the driving at high speed, as is clear from the left part of the drawing, the alert display is performed near the upper end. According to this, the alert display performed near the upper end of the image display region (area) of the HUD is displayed at a distance of about 100 m in front of the vehicle.

Namely, according to the optimization of the virtual image display position described above, the alert display (information) which is information for giving a warning of the presence of a pedestrian in front of the vehicle and a preceding vehicle can be displayed for a dangerous object farther than the stopping distance of the own vehicle while taking the relationship between the traveling speed and the stopping distance of the vehicle into account.

<Movement of Driver's Viewpoint>

Furthermore, the inventors investigated how the driver's viewpoint movement changed depending on the vehicle speed. In FIG. 8, the viewpoint movement in the case of traveling on a general road at an average speed of 50 to 60 km/h for 1 to 3 minutes is shown separately in the horizontal and vertical directions. FIG. 8(*a*) shows a range of the viewpoint movement when traveling in the daytime, and FIG. 8(*b*) shows the driver's viewpoint movement when traveling at night in the same section where the data shown in FIG. 8(*a*) is acquired.

When traveling on a general road at an average speed of 50 to 60 km/h in the daytime, a viewpoint movement width Vd in the vertical direction was 15 degrees and the center of the viewpoint movement was a depression angle of −2 degrees as shown in FIG. 8(*a*). Also, a viewpoint movement width Hd in the horizontal direction was 28 degrees, and the center of the viewpoint was shifted to the left by 5 degrees from the center because the vehicle used for the test was right hand drive vehicle and it traveled on the left lane.

When traveling in the same section at an average speed of 50 to 60 km/h in the nighttime, a viewpoint movement width Vn in the vertical direction was 11 degrees and the center of the viewpoint movement was a depression angle of −5 degrees as shown in FIG. 8(b). Also, a viewpoint movement width Hd in the horizontal direction was 16 degrees, and the center of the viewpoint had a smaller viewpoint movement range than that of daytime and was shifted to the left by 3 degrees from the center.

Next, when traveling on an express way at an average speed of 80 km/h for 1 to 3 minutes in the daytime, a viewpoint movement width Vd in the vertical direction was 14 degrees and the center of the viewpoint movement was a depression angle of 2 degrees as shown in FIG. 9(a). Also, a viewpoint movement width Hd in the horizontal direction was 14 degrees, and the center of the viewpoint was shifted to the left by 5 degrees from the center because the vehicle used for the test was right hand drive vehicle and it traveled on the left lane.

When traveling in the same section at an average speed of 80 km/h in the nighttime, a viewpoint movement width Vn in the vertical direction was 10 degrees and the center of the viewpoint movement was a depression angle of −5 degrees as shown in FIG. 9(b). Also, a viewpoint movement width Hd in the horizontal direction was 12 degrees, and the center of the viewpoint had a smaller viewpoint movement range than that of daytime and was shifted to the left by 3 degrees from the center.

From the above results, it became clear that the range and center of the driver's viewpoint movement changed depending on the vehicle speed. Then, the present invention has been made in view of such facts, and more specifically, the display position of the virtual image which is the image display position of the information display apparatus is changed in accordance with the driver's viewpoint movement only or in combination with the optimization of the display position of the virtual image in consideration of the relationship between the traveling speed and the stopping distance of the vehicle. Namely, the display position of the virtual image is set in accordance with the movement of the viewpoint position detected by the viewpoint monitoring camera 60 described above. According to this, the alert display (information) which is the information for giving a warning of the presence of a pedestrian in front of the vehicle and a preceding vehicle can be displayed in accordance with the driver's viewpoint movement and can be displayed for a dangerous object farther than the stopping distance of the own vehicle. Furthermore, it is possible to reduce the driver's viewpoint movement depending on the driving situation, and as a result, it is possible to further reduce the factors to impede the safe driving.

In addition, the driver's viewpoint movement described above exhibits different tendencies between the case of traveling in the daytime and the case of traveling in the nighttime. Namely, according to the fact that the driver's viewpoint movement is narrowed during the driving in the nighttime than that during the driving in the daytime, it is determined whether the vehicle is driving in the daytime or in the nighttime (including the driving in tunnel) by detecting the external light by the camera constituting the surroundings monitoring device 63, and the display position of the virtual image which is the image display position of the information display apparatus can be set in consideration of the result.

<Volume of Information Display Apparatus>

Figure 10:
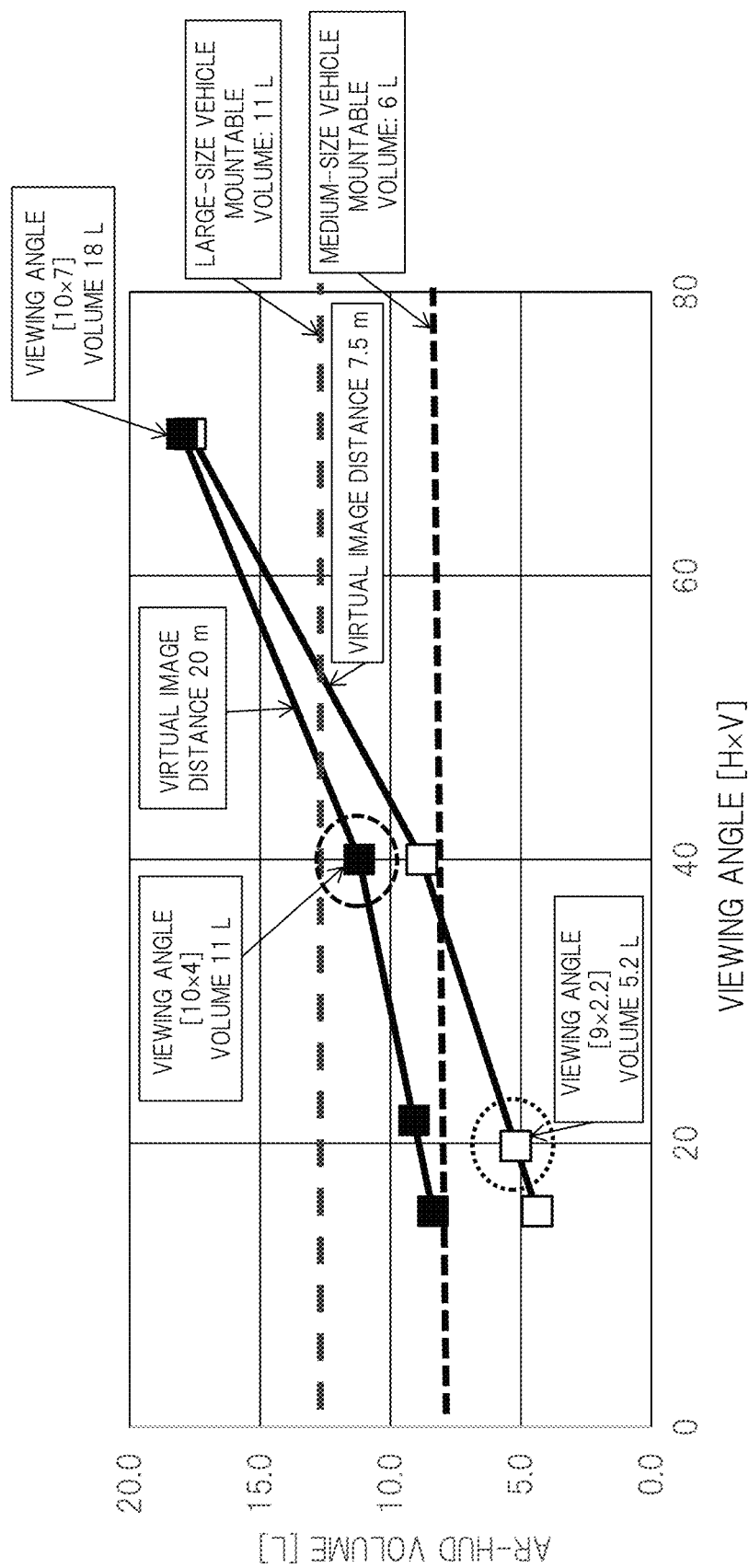
FIG. 10 is an explanatory diagram of a relationship between the volume of information display apparatus and the enlarged image display region (area) of the HUD.

Next, the relationship between the volume of the above-mentioned information display apparatus and the enlarged image display region (area) of the HUD shown in FIG. 2 will be described with reference to FIG. 10. Namely, the volume of the information display apparatus increases as the viewing angle (horizontal (H), vertical (V)) of the image display region (area) of the HUD increases. Specifically, in the case of the viewing angle of [10×7] and the virtual image distance of (20 m), the set volume of the HUD exceeds 18 L due to the size increase of the optical system including the concave mirror, which poses the problem that the information display apparatus cannot be accommodated in the space between the windshield and the steering wheel which is the place to install the apparatus. Thus, the structure of the information display apparatus for solving problem of the increase in the apparatus volume due to the increase in the viewing angle of the image display region (area) of the HUD will be described below.

Figure 11:
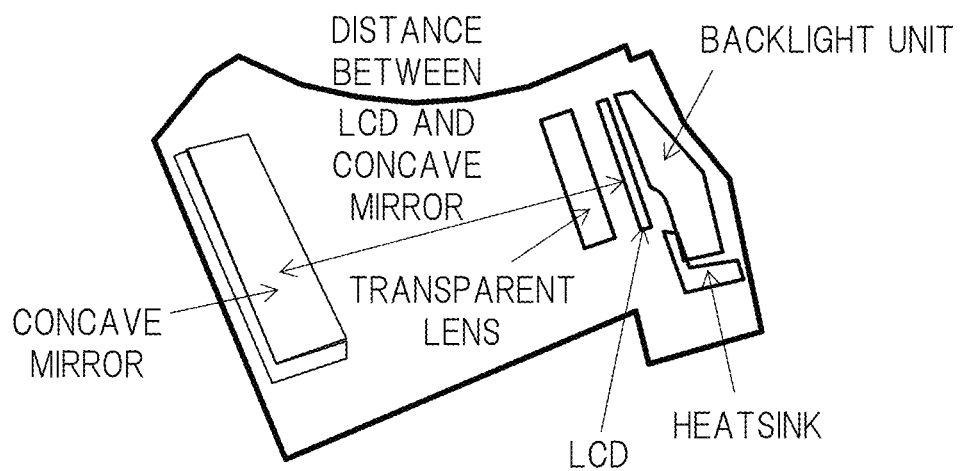
FIG. 11 is a diagram showing an example of a configuration and an arrangement (layout) of a HUD apparatus which is an information display apparatus suitable for downsizing.
Figure 12:
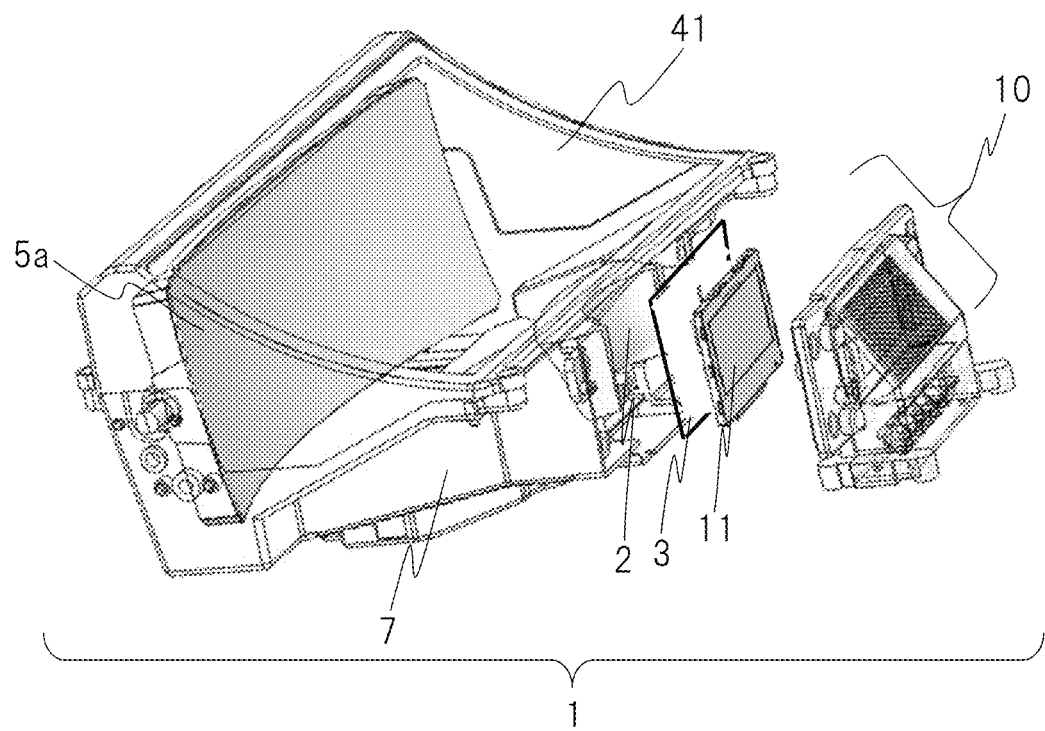
FIG. 12 is a diagram showing an example of a configuration and an arrangement (layout) of a HUD apparatus which is an information display apparatus suitable for downsizing.

FIG. 11 and FIG. 12 each show a configuration and an arrangement (layout) of the HUD apparatus 1 which is an information display apparatus suitable for downsizing. In these drawings, mainly in FIG. 12, a concave (free-form surface) mirror 5a configured to project the image light to form a virtual image through the windshield 6 (see FIG. 1), a correction lens group 2 for correcting the distortion and aberration caused in the projection, the image display device 11, and a backlight light source 10 using a light emitting diode constituting a backlight as a light source are provided in order from the downstream side. Note that 7 denotes a housing serving as an exterior case. Further, in order to suppress the P wave component of sunlight that enters the HUD apparatus 1, as an example thereof, optical means 3 for suppressing the P wave component is provided between the lens group 2 and the image display device 11. Then, an opening through which the image light is projected toward the windshield of the automobile is formed in the upper surface of the housing 7, and the opening is covered with an antiglare plate 41 (glare trap). Further, although not shown here, a concave mirror driving unit configured of an electric motor or the like for adjusting the position of the concave mirror 5a is provided integrally with the concave mirror 5a. Then, these components are modularized and formed compactly while ensuring a minimum distance between the LCD and the concave mirror.

In order to expand the viewing angle in such a configuration and arrangement, for example, the concave mirror 5a is rotationally driven, and in order to realize the distant virtual image distance, the collimator optical system 3 is appropriately set, so that desired characteristics can be realized. Alternatively, it is also possible to enlarge the image display region (area) of the HUD by adding a second information display apparatus configured to obtain a real image by scanning the windshield with laser light by using MEMS elements.

Namely, by adopting the HUD apparatus 1 having the above-described configuration and arrangement, the above-mentioned problem of the increase in the apparatus volume due to the increase in the viewing angle of the image display region (area) of the HUD can be solved, and the HUD apparatus can be accommodated in the installation place, that is, the space between the windshield and the steering wheel.

In the foregoing, the information display apparatus according to various embodiments of the present invention has been described above. However, the present invention is not limited to the above-described embodiments, and includes various modifications. For example, the above embodiments have described the entire system in detail in order to make the present invention easily understood, and the present invention is not necessarily limited to those having all the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SINGS LIST

1 . . . HUD apparatus, 4 . . . intermediate image forming unit, 5 . . . optical component, 5a . . . concave mirror, 6 . . . projection-receiving member (windshield), 7 . . . housing, 8 . . . driver's line of sight, 11 . . . image projection device, 2, 21, 22 . . . optical element (lens), 30 . . . control device, 31 . . . storage device, 32 . . . microcomputer, 33 . . . RAM, 34 . . . ROM, 41 . . . antiglare plate (glare trap), 61 . . . navigation system, 62 . . . driving support electronic control unit (driving support ECU), 63 . . . surroundings monitoring device, 60 . . . driver's viewpoint monitoring camera, 63 . . . surroundings monitoring device, 101 . . . vehicle body.

The invention claimed is:

1. An information display apparatus configured to display image information as a virtual image in a transportation, the information display apparatus comprising:
a light source configured to generate light;
a projector configured to reflect and project the light from the light source; and
circuitry configured to acquire information of the transportation,
wherein a viewing angle of a display region of the virtual image in a horizontal direction and a depression angle with respect to the display region of the virtual image are changed based on the information of the transportation acquired by the circuitry, and
wherein the display region of the virtual image moves up and down in accordance with the change in the depression angle and a width of the display region of the virtual image is changed in accordance with the change in the viewing angle,
wherein the information of the transportation includes a traveling speed of the transportation.

2. The information display apparatus of claim 1,
wherein when the traveling speed of the transportation is above a threshold value, the viewing angle of the display region of the virtual image in the horizontal direction is narrowed.

3. The information display apparatus of claim 2,
wherein when the traveling speed of the transportation is below the threshold value, the viewing angle of the display region of the virtual image in the horizontal direction is widened more than the viewing angle when the traveling speed of the transportation is above the threshold value.

4. The information display apparatus of claim 3,
wherein the viewing angle in a vertical direction remains unchanged between the case in which the traveling speed of the transportation is above the threshold value and the case in which the traveling speed of the transportation is below the threshold value.

5. The information display apparatus of claim 1,
wherein a display position of the virtual image in the display region when the traveling speed of the transportation is higher than a threshold value is higher than a display position of the virtual image in the display region when the traveling speed of the transportation is below the threshold value.

6. The information display apparatus of claim 1,
wherein the image information is displayed at a position farther than a stopping distance which is a total of a free running distance and a braking distance in accordance with the traveling speed.

7. The information display apparatus of claim 6,
wherein the image information includes alert information.

8. The information display apparatus of claim 7,
wherein the alert information is information for giving a warning of a presence of a pedestrian in front of the transportation and/or a preceding transportation.

9. The information display apparatus of claim 1, further comprising:
sensor configured to detect whether the transportation is traveling in daytime or nighttime based on external light.

10. The information display apparatus of claim 9,
wherein the display position of the virtual image is set in accordance with a detection result of the sensor.

11. The information display apparatus of claim 1,
wherein the projector includes a concave mirror configured to reflect the light emitted from the light source and project the light toward a windshield of the transportation.

12. The information display apparatus of claim 11,
wherein the concave mirror has a rotation mechanism.

13. An automobile comprising:
an information display apparatus configured to display image information as a virtual image in the automobile,
wherein the information display apparatus comprises:
a light source configured to generate light;
a projector configured to reflect and project the light from the light source; and
circuitry configured to acquire information of a traveling speed of the automobile,
wherein a viewing angle of a display region of the virtual image in a horizontal direction and a depression angle with respect to the display region of the virtual image are changed based on the information of the automobile acquired by the circuitry, and
wherein the display region of the virtual image moves up and down in accordance with the change in the depression angle and a width of the display region of the virtual image is changed in accordance with the change in the viewing angle.

14. The automobile of claim 13,
wherein when the traveling speed of the automobile is above a threshold value, the viewing angle of the display region of the virtual image in the horizontal direction is narrowed.

15. The automobile of claim 14,
wherein when the traveling speed of the automobile is below the threshold value, the viewing angle of the display region of the virtual image in the horizontal direction is widened more than the viewing angle when the traveling speed of the automobile is above the threshold value.

16. The automobile of claim 15,
wherein the viewing angle in a vertical direction remains unchanged between the case in which the traveling speed of the automobile is above the threshold value and the case in which the traveling speed of the automobile is below the threshold value.

17. A method of displaying image information as a virtual image in a transportation, the method comprising:
generating light by a light source;
reflecting and projecting the light from the light source;

acquiring information of the transportation;
changing a viewing angle of a display region of the virtual image in a horizontal direction and a depression angle with respect to the display region of the virtual image based on the acquired information of the transportation; and
moving up and down the display region of the virtual image in accordance with the change in the depression angle and changing a width of the display region of the virtual image in accordance with the change in the viewing angle,
wherein the information of the transportation includes a traveling speed of the transportation.

18. The method of claim 17, further comprising:
narrowing the viewing angle of the display region of the virtual image in the horizontal direction when the traveling speed of the transportation is high;
widening, more than the viewing angle when the traveling speed of the transportation is above a threshold value, the viewing angle of the display region of the virtual image in the horizontal direction when the traveling speed of the transportation is below the threshold value; and
maintaining the viewing angle in a vertical direction between the case in which the traveling speed of the transportation is above the threshold value and the case in which the traveling speed of the transportation is below the threshold value.

\* \* \* \* \*